United States Patent [19]
Chittal

[11] Patent Number: 5,314,034
[45] Date of Patent: May 24, 1994

[54] POWERED MONOCYCLE

[76] Inventor: Nandan R. Chittal, 10/6, Sahajivan, Barve Nagar, Bombay 400084, India

[21] Appl. No.: 791,846

[22] Filed: Nov. 14, 1991

[51] Int. Cl.[5] .................................................. B62D 21/00
[52] U.S. Cl. ..................................... 180/21; 280/205
[58] Field of Search ................... 280/205; 180/21, 282; 114/122, 121

[56] References Cited

U.S. PATENT DOCUMENTS

| | | | |
|---|---|---|---|
| 1,240,678 | 9/1917 | Corneil | 180/21 |
| 1,290,087 | 1/1919 | Christie | 180/21 |
| 2,415,056 | 1/1947 | Wheeler | 180/21 |
| 2,802,300 | 8/1957 | Rogers | 280/205 |
| 3,511,454 | 5/1970 | Hamilton | 280/282 |
| 3,876,025 | 4/1975 | Green | 180/21 |

FOREIGN PATENT DOCUMENTS

| | | | |
|---|---|---|---|
| 82888 | 3/1920 | Switzerland | 280/205 |
| 89/04272 | 5/1989 | World Int. Prop. O. | 280/205 |

*Primary Examiner*—Eric Culbreth

[57] ABSTRACT

A monocycle comprising of a single tyred wheel, a handlebar and engine means, stabilized by a gyro flywheel means having substantially large moment of inertia.

5 Claims, 1 Drawing Sheet

5,314,034

POWERED MONOCYCLE

BACKGROUND OF THE INVENTION

1. Field of the Invention.

This invention relates generally to a single wheeler power driven vehicle which can be used as a means of road transport and fun.

2. Description of the Prior Art.

A conventional monocycle (or unicycle) mainly consists of a single wheel, a pedal mechanism to drive the wheel, and a seat at the top for the rider. A conventional Monocycle is used mostly in a circus or such other places of entertainment. Because riding it indeed is a balancing act, it is never available as a convenient means of road transport to the common man.

SUMMARY OF THE INVENTION

This invention relates generally to a powered monocycle which comprises a tyred wheel, an engine means to drive the wheel, and a gyro flywheel means.

Accordingly the primary object of the present invention is to remove the drawbacks of a conventional monocycle and to provide a monocycle which is power driven, offers sufficient stability and safety so that a common man can ride it comfortably and use it as a convenient means of a road transport and fun.

The objects, features and advantages of the present invention and also its method of operation and working will be obvious from the description of the preferred embodiment of the invention when read in conjunction with the accompanying drawings.

DESCRIPTION OF THE PREFERRED EMBODIMENT

Figure 1:
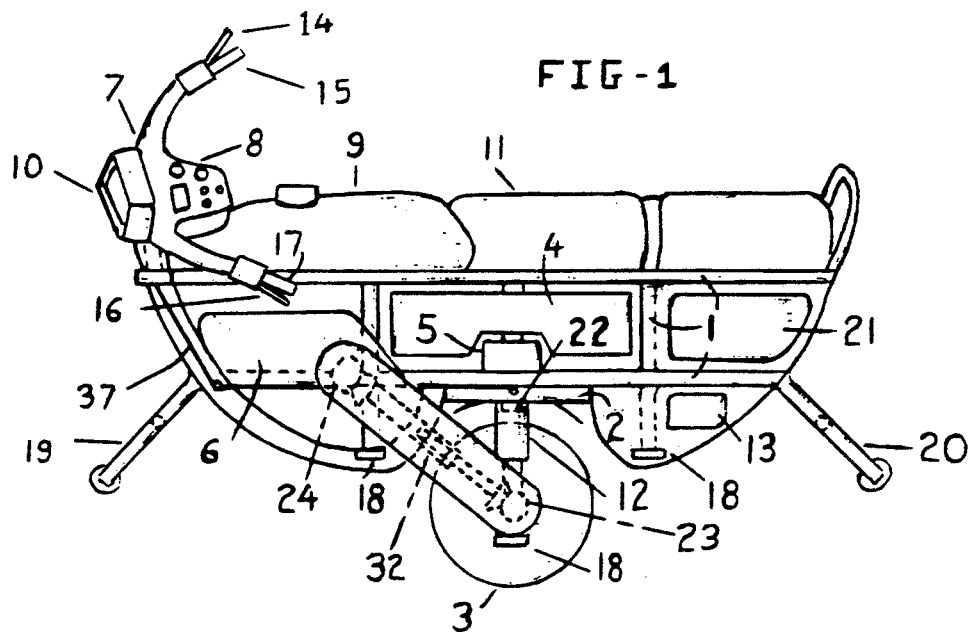
FIG. 1 is a side view showing an embodiment of the powered monocycle.
Figure 2:
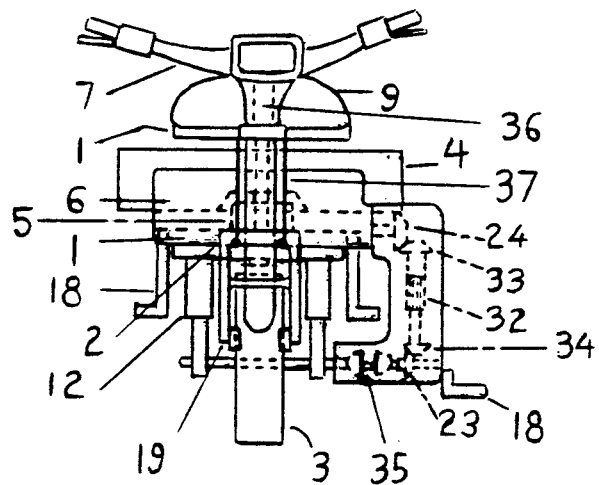
FIG. 2 is a front elevation showing the embodiment.

Referring to FIG. 1 and FIG. 2, an embodiment of the powered monocycle is shown. In this embodiment the powered monocycle comprises, a pneumatic tyred wheel means (3) connected to a wheel frame means (2) by a shock absorber suspension means (12). The wheel frame (2) is rotatably pivoted by pivot means (22) to the lower end surface of a rigid vehicle frame structure (1), so that the wheel (3) can turn to left or right with respect to the vehicle frame, without restriction. In front of the wheel frame (2) and firmly fixed to the vehicle frame (1) is an engine and gearbox assembly means (6). A transmission assembly comprising universal joints, gear wheels and sliding shafts is attached to the left side of the vehicle frame (1) as shown in FIG. 1 and FIG. 2 to transmit engine power to the wheel (3) without restricting the left or right turning movement of the wheel (3) with respect to the vehicle frame (1). Above the wheel frame (2), supported by the vehicle frame (1) and bearing means, in a horizontal plane is a heavy gyro flywheel means (4) with substantially high total moment of inertia (rotational inertia). The gyro flywheel (4) is spun about a vertical axis (perpendicular to the ground plane) by an electrical motor means (5) which is also attached to the vehicle frame (1) and draws current from a storage battery (13) and, optionally, also from an electricity generating means coupled to the engine means (6). A fuel tank (9) and a rider's seat (11) are fixed on the top surface of the vehicle frame above the gyro flywheel plane and toolbox compartment 21). At the top front, just above the fuel tank (9) is an handlebar assembly means (7) pivoted to the vehicle frame (1) rotatably, which comprises a headlight (10) at the front end, an instrument display panel means (8) at the top and two handgrip means (15,17) at the sides. The handle bar assembly means (7) also comprises a lever mechanism means to transfer the left/right handle bar movement to the wheel frame and the wheel (3) to turn it to the left or right accordingly, with respect to the vehicle frame (1).

The heavy gyro flywheel means is supported by bearings in a horizontal plane, above the wheel (3), and is driven by the electric motor means (5) about a vertical axis. The mass, shape and size of the flywheel means is determined so as to have a substantially large moment of inertia. The outer diameter of the flywheel means is such that it will not obstruct the rider. The heavy gyro flywheel means spinning at high speed possesses a large angular momentum, and while conserving its angular momentum it provides the gyroscopic stability to the vehicle frame. A considerable torque is required to deflect the spin axis. If a deflection is produced (precision), the spinning flywheel conserves its angular momentum by generating a torque (couple) about an axis which is perpendicular to both the spin axis and precision axes. The powered monocycle working on this principle stands upright, just like a spinning top, with the rider and passenger as long as the flywheel has sufficiently large angular momentum. Small deflecting torques due to road bumps produce an insignificant deflection of the spin axis.

The electric Motor spinning the gyro flywheel draws the current from an electricity generating means coupled to the engine when the engine is running and from a storage battery (13) otherwise. The switch over by conventional switch means is automatic ensuring the gyro flywheel is spinning even if the engine fails in between. The gyro flywheel can be started independently of the engine and the spin speed can be varied by a known type of selector switch means depending on the road and load conditions. Gyro flywheel RPM are displayed on a tachometer dial. If the selected RPM cannot be maintained due to changes in the input voltage of the motor, a conventional indicator means gives an audible and visual indication to the rider, who may then choose to slow down and stop.

The display panel on the handlebar comprises instruments like speedometer, odometer, tachometers for engine and flywheel, fuel gauge, ammeter; various indicator lights like turn-signal; switches like ignition keyswitch, flywheel RPM selector switch and the like. The handlebar has a clutch lever(16) and gear change handgrip (17) to the left which are used to operate the gearbox assembly through the known type of gear changing mechanism. To the right side of the handlebar is the brake lever(14) and throttle handgrip (15) which are used to operate the known type of brake assembly means and to control the engine output power respectively. At the lower front, attached to the vehicle frame is a 'H' shaped stand means (19) with two small rubber padded wheels at its end. The stand is to park the monocycle and also to protect the front portion from hitting the ground, if monocycle ever nose dives. A rear stand means (20) is similar in construction and prevents the rear bottom portion from hitting the ground. Three footrests (18) are provided at different positions, so the rider and passenger can position themselves comfortably.

Figure 3:
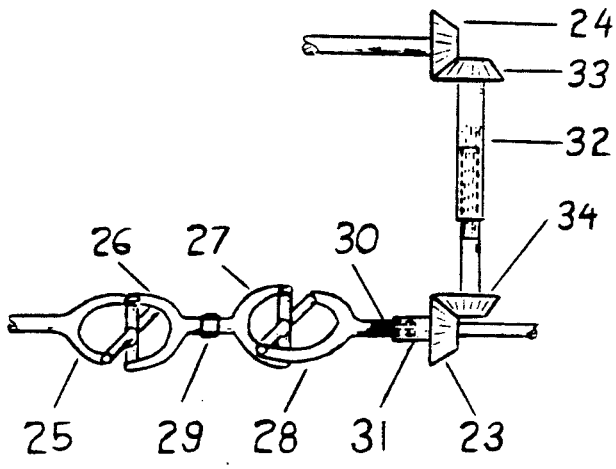
FIG. 3 is a detailed expanded view of the transmission assembly means.

FIG. 2 shows the front elevation of the Monocycle. Details of engine and battery assembly are excluded for the sake of clarity. As shown in the figure a pneumatic tyred wheel (3) is suspended from the wheel frame (2) by two shock absorber (12) means. The wheel frame is connected to the vehicle frame (1) such that the former is free to turn to left or right with respect to the latter. The axle of wheel (3) is connected by a double universal joint assembly (35) to a gear wheel (23). Details of the universal joint assembly (35) are shown in FIG. 3. Gear wheel (23) is coupled by a propeller shaft (32) to the driver wheel (24) which is fitted on the engine output shaft as shown in FIG. 2. The handlebar (7) is connected by a spindle (36) and bearing means to the vehicle frame so that the rider can turn it to the left or right. Handlebar movement is transferred by the spindle through a known type of lever (37) assembly means to the wheel frame (2) and the wheel follows the movement of the handlebar.

FIG. 3 shows the details of the universal joint assembly (35) mentioned in FIG 2. As shown in FIG. 3 axle of the tyred wheel (3) is connected to a universal joint (25,26) which in turn is connected to another universal joint (27,28) end to end by a movable joint (29). The second universal joint has a splined shaft (30) which slides into a hollow and likewise splined shaft (31) of the gear wheel (23). The gear wheel (23) is fixed to the protruding cover portion of the vehicle frame (1) by bearing means, and is driven by the driver gear wheel (24) through a shaft (32). The propeller shaft (32) connecting gear wheel (24) to gear wheel (23) comprises a hollow tubular splined shaft which slides into another likewisely splined hollow shaft, and the outer free ends of both the shafts have gear wheels(33,34) which mesh with gear wheels (24) and (23) respectively. The splined hollow propeller shaft (32) compensates the vertical bumping movement of the wheel and ensures constant gear meshing. As shown in FIG. 3 the two universal joints (25,26) and (27,28) together with the movable joint (29) offer a freedom of movement around two axes and allow the wheel (3) to receive engine torque even when the wheel is turned to the left (inward) or to the right (outward). Sliding splined shafts (30) and (31) compensate for the sideway displacement and ensure that they remain meshed over the entire range of handlebar movement.

Another embodiment of the powered monocycle comprises a mechanism means to couple the engine power to the gyro flywheel means selectively, so as to start the heavy gyro flywheel spinning from its stationary state. Still another possible embodiment of the powered monocycle comprises more than one smaller gyro flywheels means attached to the vehicle frame (1), not necessarily in the same plane, with their respective spin axes not necessarily perpendicular to the ground plane. Still another embodiment comprises a mechanism means to engage the reverse gear so that the wheel is revolved in the reverse direction.

A powered monocycle can have a kick start, push button start or both. Means and type of the Monocycle engine and gearbox assembly, the mechanism used to change the gears i.e. hand or leg operated, numbers of gears available, and the method and type of braking system used does not change the essence, spirit or scope of the invention. The type of mechanism used to turn the wheel according to the handlebar movement and also the method used to transmit engine power to the wheel namely chain drive, direct coupled and the like does not change the essence, spirit or scope of this invention.

While but a certain embodiment of the present invention has been shown and described, it will be obvious to those skilled in the art that numerous changes in form and arrangements of parts may be made to suit requirements without departing from the spirit and scope of the present invention.

I claim:

1. A powered monocycle which comprises:
   a vehicle frame defining at least a lower end, a top front end and front and rear portions;
   engine assembly means attached to said vehicle frame;
   a tyred wheel means;
   suspension means rotatably connecting said tyred wheel means to said lower end of said vehicle frame;
   transmission assembly means attached to said vehicle frame for transmitting power from said engine assembly means to said wheel means;
   gyro flywheel means attached to said vehicle frame;
   means attached to said vehicle frame for spinning said gyro flywheel means at a desired speed; and
   handle bar assembly means pivotally attached to said vehicle frame at said top front end, said handle bar assembly means comprising a headlight, instrument panel means and handgrip means.

2. A powered monocycle according to claim 1 wherein said gyro flywheel means comprises:
   a flywheel defining a spin axis, said flywheel normally positioned with said spin axis substantially perpendicular to a ground plane; and
   bearing means connected to said vehicle frame and to said flywheel.

3. A powered monocycle according to claim 1 and further comprising stand means defining ends and attached to said front and rear portions of said vehicle frame, said stand means including wheels attached to said ends of said stand means.

4. A powered monocycle according to claim 1 further comprising gearbox mechanism means in operative relationship with said wheel means for optionally reversing the direction of rotation of said wheel means.

5. A powered monocycle as in claim 1 wherein said gyro flywheel spinning means comprises an electric motor means.

* * * * *